United States Patent [19]

Misceo

[11] Patent Number: 6,044,755
[45] Date of Patent: Apr. 4, 2000

[54] ICE CREAM CONE MAKING MACHINE

[76] Inventor: Vincenzo Misceo, 3038 Plymouth Dr., North Vancouver, British Columbia, Canada, V5C 4E4

[21] Appl. No.: 09/401,792

[22] Filed: Sep. 22, 1999

[51] Int. Cl.[7] ............................. A47J 37/00; A47J 37/08; H05B 3/06

[52] U.S. Cl. ............................... 99/332; 99/331; 99/337; 99/344; 99/372; 99/374; 99/377; 99/378; 99/380; 99/389; 219/521; 219/525

[58] Field of Search ............................. 99/331–334, 337, 99/338, 342–344, 352, 372–380, 447, 422, 423, 426, 427, 385–391; 219/521, 524, 525, 536, 537; 426/523

[56] References Cited

U.S. PATENT DOCUMENTS

| | | | |
|---|---|---|---|
| 1,498,654 | 6/1924 | Hauptman | 219/525 |
| 2,478,529 | 8/1949 | Farr et al. | 219/524 |
| 2,765,727 | 10/1956 | Lipisch et al. | 219/525 X |
| 3,236,998 | 2/1966 | Wertheimer et al. | 219/524 |
| 3,245,337 | 4/1966 | White et al. | 99/332 X |
| 3,377,942 | 4/1968 | Carbon | 219/376 |
| 3,788,302 | 1/1974 | Malaney et al. | 99/330 |
| 3,799,047 | 3/1974 | Freeman . | |
| 3,999,473 | 12/1976 | Carbon | 99/377 |
| 4,531,048 | 7/1985 | Carbon | 219/525 |
| 4,682,012 | 7/1987 | Wolf et al. | 99/332 |
| 4,817,510 | 4/1989 | Kowalics et al. | 99/331 |
| 4,913,038 | 4/1990 | Burkett et al. | 99/331 |
| 5,636,564 | 6/1997 | Weiss | 99/332 |

*Primary Examiner*—Timothy Simone
*Attorney, Agent, or Firm*—Oyen Wiggs Green & Mutala

[57] ABSTRACT

Prior ice cream cone baking machines were manually raised and lowered, causing the cone to be sometimes overcooked or burnt. The present invention automatically raises the upper cooking plate after a pre-set cooking time, and maintains the baked cake at a warm temperature until removed from the lower cooking plate.

9 Claims, 5 Drawing Sheets

ICE CREAM CONE MAKING MACHINE

TECHNICAL FIELD

The invention relates to the field of machines for making ice cream cones, and more particularly a machine for automatically baking waffle cones.

BACKGROUND ART

Many ice cream stores feature ice cream cones having baked cones, called waffle cones, freshly baked on the premises for serving their scoops of ice cream, instead of, or in addition to, the usual pre-baked, mass-produced cones. By baking such cones on the premises, customers are attracted not only by the improved taste and texture of the waffle cones but also by the aroma created by the baking process. Such waffle cones are baked from a batter which is thicker and more cookie-like than that used for breakfast-type waffles, and are cooked thinner than breakfast waffles, so that they are malleable to form a cone when hot and harden when cool. Such waffle cones are baked on-site using manual waffle cone griddles also called pizelle irons which are generally round. Typically these will consist of a pair of heated griddle plates, each having a fixed lower heated griddle plate and a pivoting heated upper griddle plate which can be manually pivoted by an attached handle into, or out of, position above the fixed griddle plate. A timer may also be provided for signalling by a bell or buzzer when a chosen baking time has elapsed. The ice cream store employee opens one or both of the pre-heated griddles, pours the desired amount of batter onto the lower fixed griddle plate to form a circular cake or cookie, closes the upper pivoting griddle plate onto the lower griddle plate and starts the timer. When the desired baking time has elapsed the timer emits a signal, and the employee raises the upper griddle and removes the hot, baked cake from the lower griddle. The hot, thin cake, which is flexible when hot, is then wrapped around a cone-shaped form to form a cone, removed from the form and placed in a holder to cool and harden.

A problem with this existing method of baking waffle cones is that it requires constant attention from the employee/attendant. Often the same employee who is charged with baking cones also must serve ice cream to customers. If the employee is busy when the timer on the waffle griddle signals that the cake is cooked, then the cake may be over-cooked or burned.

Baking machines for baking breakfast-type waffles are known which automatically eject the waffle when cooked. For example, U.S. Pat. No. 3,799,047 issued Mar. 26, 1974 to Freeman discloses an apparatus to bake breakfast-type waffles in which a timer is provided for timing a baking period, at the end of which a servo-motor is activated to release a spring-driven lever to raise the upper griddle plate and lift the waffles off the lower plate. Such an arrangement would be unsuitable for waffle cones in that the waffle would quickly cool and harden in the raised position before the attendant could form the waffle into a cone.

There is therefore a need for an ice cream cone baking machine which automatically terminates the baking procedure when the cake is sufficiently cooked without allowing the cake to either cool or overcook.

Disclosure of Invention

The present invention provides an apparatus for baking waffle cones comprising a) a lower cooking plate provided with a first electric heating element; b) an upper cooking plate provided with a second electric heating element and pivotable between a first open position spaced from the lower cooking plate and a second closed position parallel to and in contact or near contact with the lower cooking plate; c) motor means for pivoting the upper cooking plate between the first and second positions; d) first switch means for activating the motor means to lower the upper cooking plate to the second position; e) timing means for activating the motor means to raise the upper cooking plate to the first position after a pre-determined period of time; and f) temperature control means for sensing the temperature of the lower cooking plate and providing electric power from a supply of electric power to the first and second heating elements when the lower cooking plate is below a predetermined temperature and ceasing to provide electric power when the lower cooking plate is above a predetermined temperature.

BRIEF DESCRIPTION OF DRAWINGS

In drawings illustrating a preferred embodiment of the invention.

BEST MODE(S) FOR CARRYING OUT THE INVENTION

Figure 1:
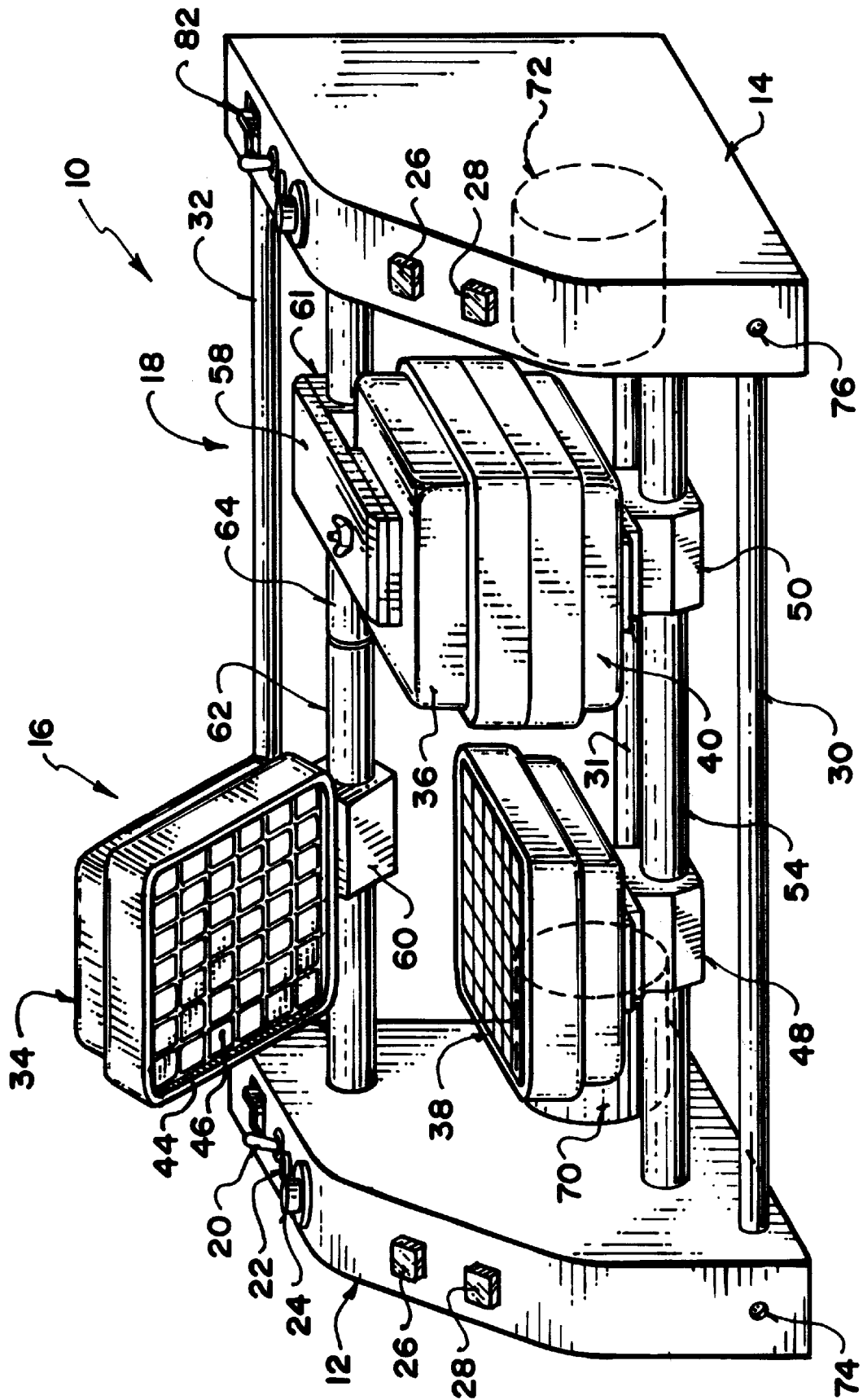
FIG. 1 is a perspective view of the invention, with one griddle in the open position and one in the closed cooking position.
Figure 2:
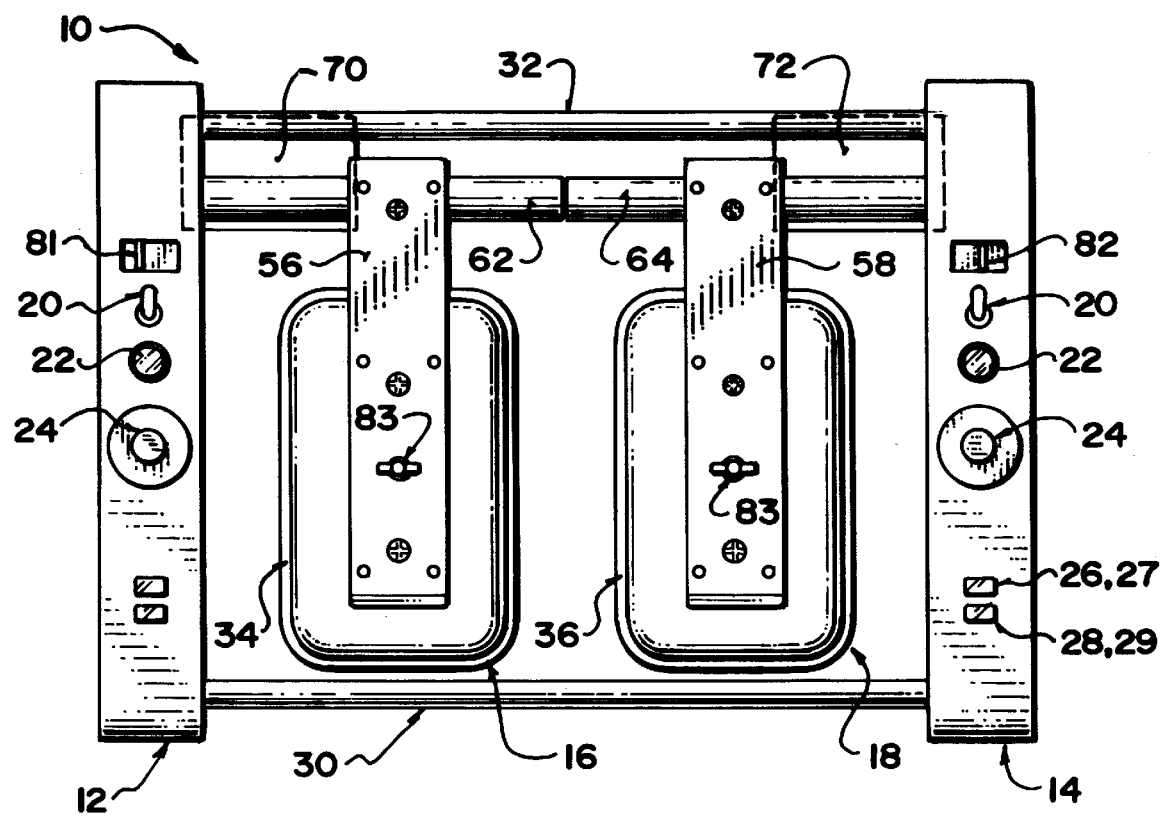
FIG. 2 is top view of the invention with both griddles in the closed position.
Figure 3:
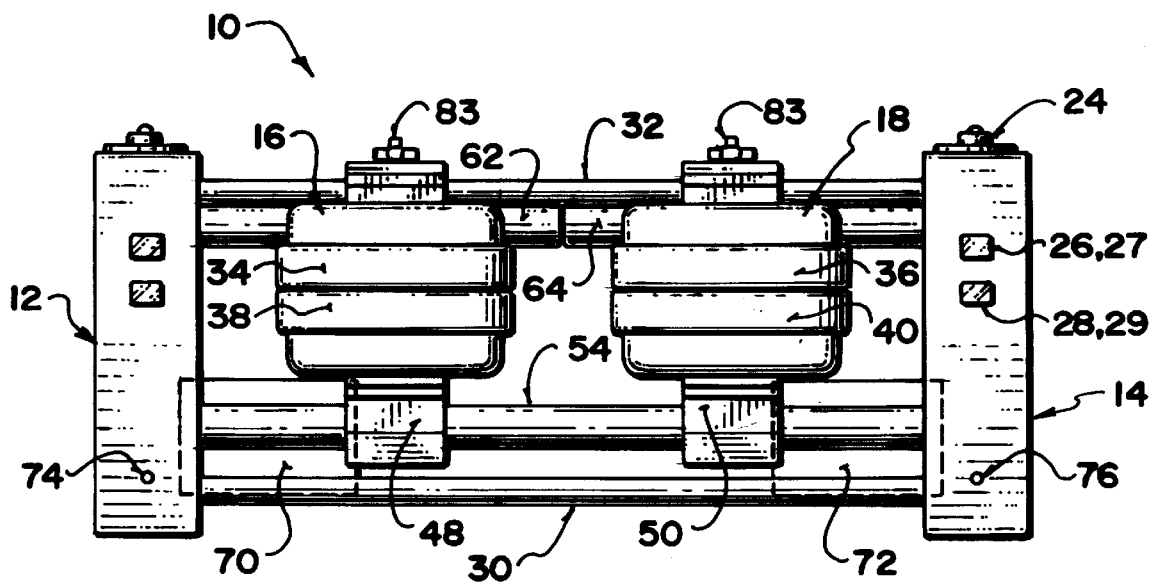
FIG. 3 is front view of the invention with both griddles in the closed position.
Figure 4:
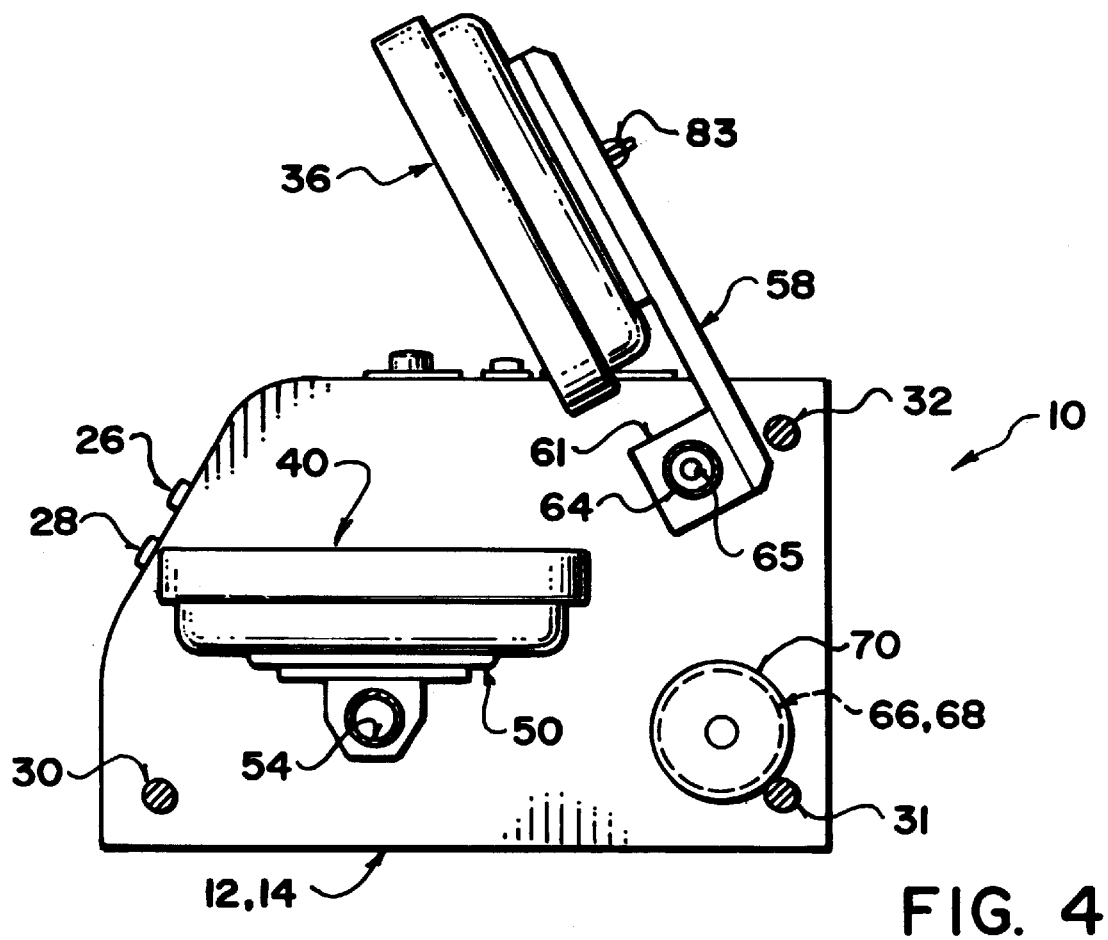
FIG. 4 is right side view of the invention, with the housing sides cut away for illustration and with both griddles in the closed position.
Figure 5:
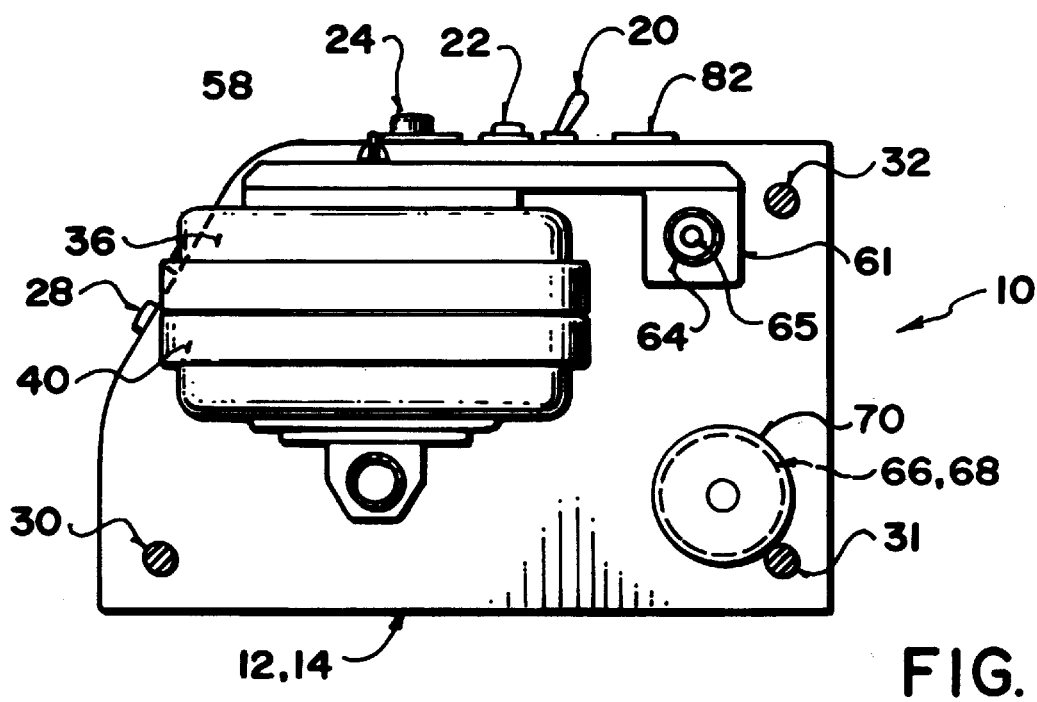
FIG. 5 is right side view of the invention, with the housing sides cut away for illustration with both griddles in the closed position.
Figure 6:
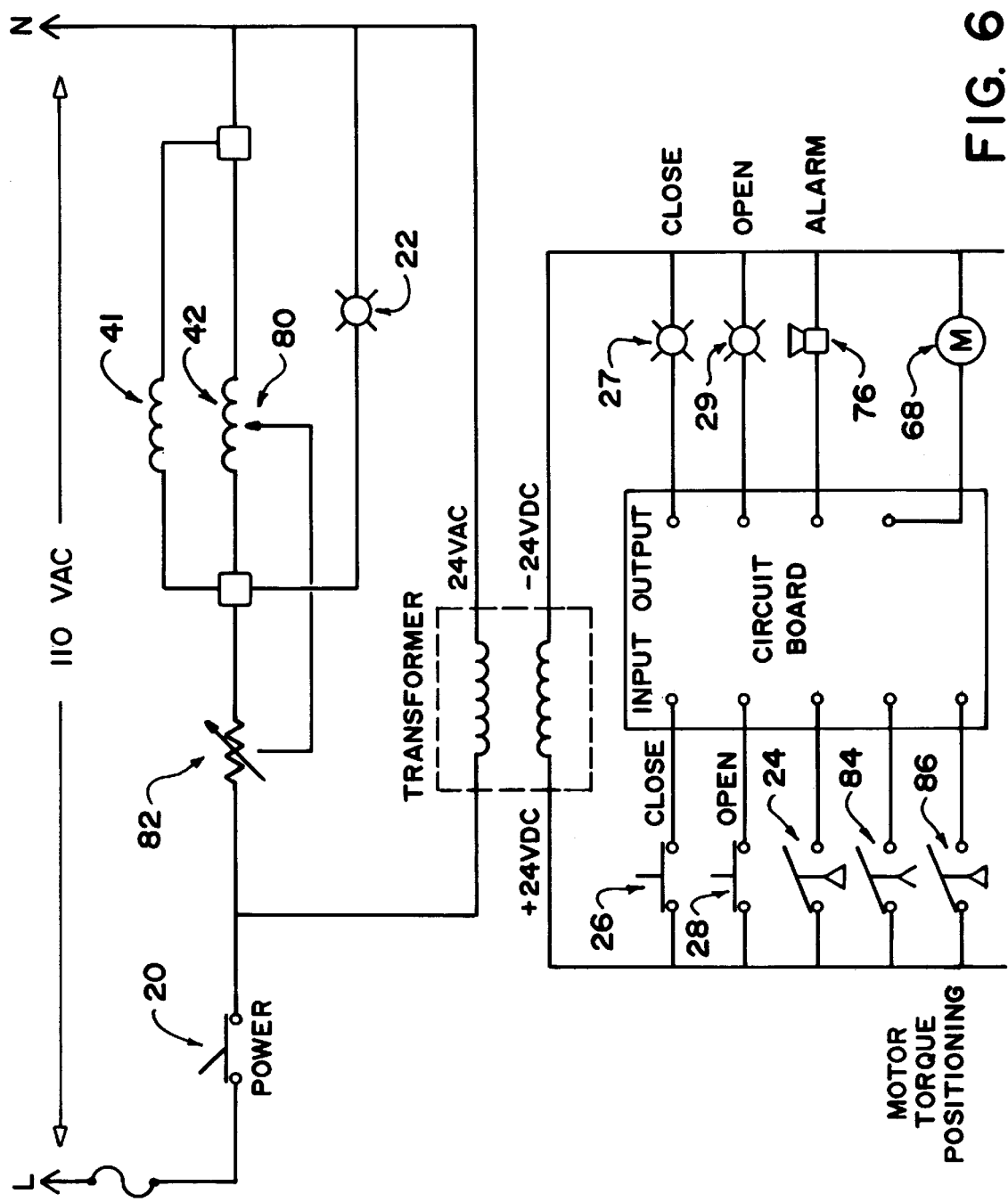
FIG. 6 is circuit diagram for the electrical circuit for one of the two griddle assemblies of the invention, both being identical.

With reference to FIGS. 1 through 7, a waffle cone baking machine according to the invention is designated by reference numeral 10. It comprises left and right griddle assemblies 16, 18 mounted between left and right housings 12, 14. Left and right griddle assemblies 16, 18 each comprise top cooking plates 34, 36 and bottom cooking plates 38, 40 respectively. Each cooking plate is TEFLON™ coated cast iron provided with top and bottom electric heating elements 41, 42 (FIG. 6) consisting of heating coils (not shown), and has a shallow upstanding rim 44 to retain batter, and shallow cross-hatched grooves 46 to provide the cone's surface pattern. Each housing 12, 14 has a griddle on/off switch 20, on/off indicating light 22, timer knob 24, top cooking plate close button 26 and indicator light 27 and top cooking plate manual open button 28 and indicator light 29. Right and left housings 12, 14 are joined by cross-bars 30, 31, 32 secure at the lower front and upper and lower rear corners of the housings.

Figure 7:
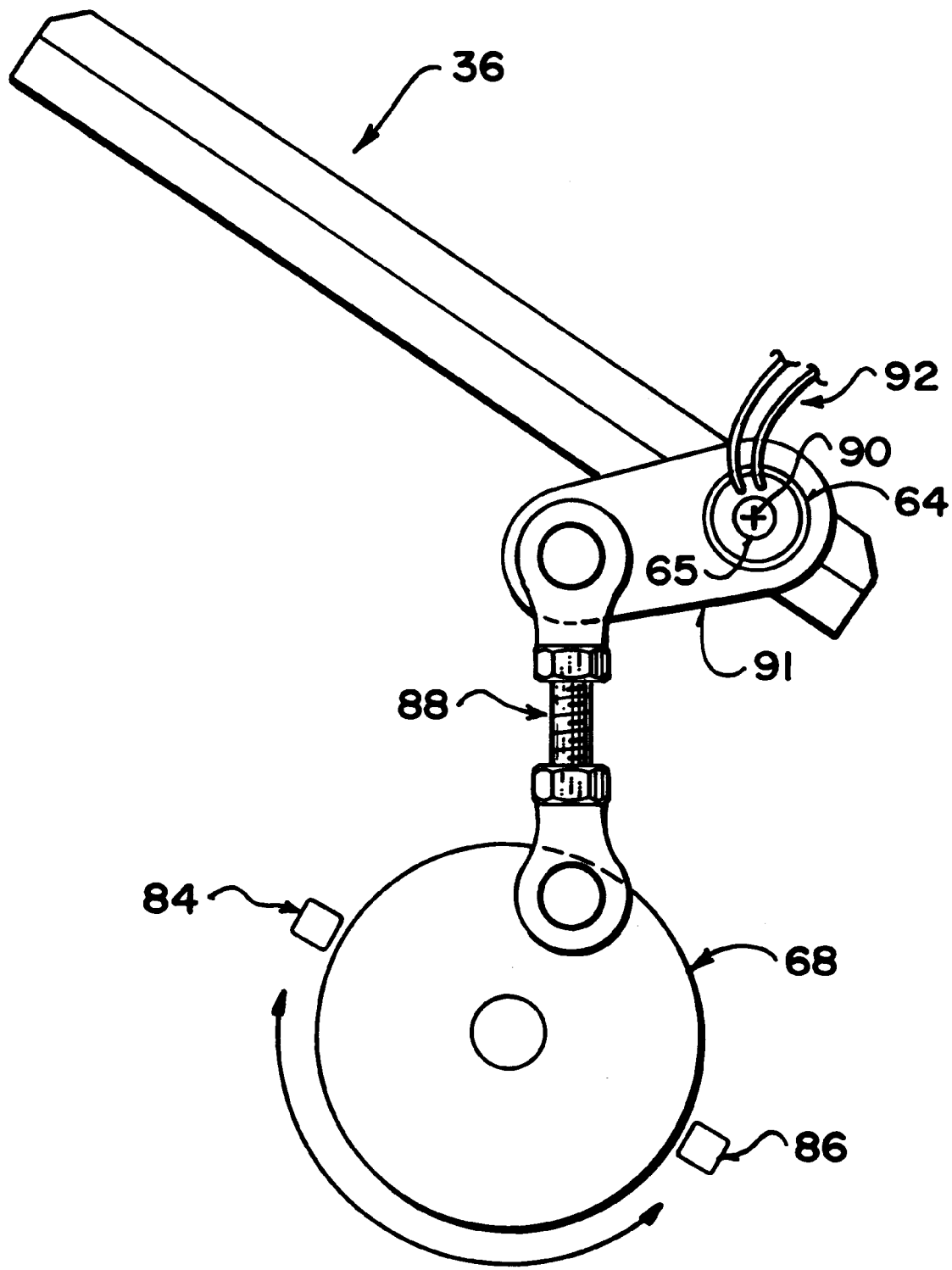
FIG. 7 is a detail of the motor drive mechanism with the top cooking plate in the open position.

Bottom cooking plates 38, 40 are secured to pedestals 48, 50 which are in turn fixed to cross-brace 54 through which the electrical supply to heating elements 42 is provided. Top cooking plates 34, 36 are mounted on arms 56, 58 which are in turn mounted to fixed blocks 60, 61 on rotating tubes 62, 64, each of which rotates on half of a fixed shaft 65 extending between, and fixed to, housings 12, 14. An adjusting nut 83 permits the height of top cooking plates 34, 36 on arms 56, 58 to be adjusted, thereby adjusting the thickness of the cake between the top and bottom cooking plates. The ends of tubes 56, 58 extend into housings 12, 14 and are rotated by motors 66, 68 in motor housings 70, 72. Motors 66, 68 are preferably 24 volt DC miniature recipocating motors which drive tubes 62, 64 by adjustable connecting rod 88 as shown in FIG. 7. FIG. 7 shows the top cooking plate 36 in the open position. Activation of motor 68 causes the motor to rotate clockwise until stopped by microswitch 86. Connector 61 pivots around axis 90, causing the plate 36 to close. To open, motor 68 rotates counterclockwise until stopped by microswitch 84. Wires 92 providing power to the heating element extend through axis 90. Two beeper alarms 74, 76 are provided to signal when cooking on either side is complete. Thermocouple temperature sensors 78, 80 associated with each bottom cooking plate 38, 40 sense the temperature of the lower cooking plates and turn the heating elements on or off when the temperature of the lower cooking plate decreases or increases beyond a pre-set limit set on temperature controls 81, 82. Alternatively the temperature control can be fixed internally by the thermocouple with a fixed minimum and maximum temperature.

In operation, the desired temperature is set on the temperature controls panels 81, 82 and the timer knobs 24 are set to the desired time for each griddle for optimum cooking operation. Initially, both upper cooking plates are in the raised, open position. The machine on/off switch 20 is turned "on", causing the indicator 22 to illuminate and heating elements to heat top and bottom cooking elements 36, 38, 40, 42. After allowing the elements to heat up, the attendant pours the waffle cone batter onto one or both of the lower cooking plates 38, 40 and presses the top cooking plate close button 24 and/or 26 associated with the bottom cooking plate on which the batter has been poured, illuminating a green indicator light causing the motor to close the top cooking plate until one of microswitches 84 causes the motor to stop the cooking plate in the proper closed position, and causing the timer for that griddle to start. Once the time set on either of the timers expires, alarm beeper 76 or 78 for that timer sounds, and the motor associated with that timer is activated to open the top cooking plate until one of microswitches 86 causes the motor to stop the cooking plate in the proper open position. The cooked cone cake remains heated on the heated bottom cooking plate until the attendant removes it, or turns off the machine on/off switch. The cake is kept warm but not overcooked due to the temperature control and the fact that the top cooking plate is open. If the attendant needs to open the top cooking plate before the timer has opened it, the attendant presses the cooking plate manual open button 28 which activates motor 68 to open the top cooking plate.

In this way the cake for the waffle cone is automatically cooked to the desired degree and is kept warm and flexible until the attendant is free to remove it and form it into a cone.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for baking waffle cones comprising:
   a) a lower cooking plate provided with a first electric heating element;
   b) an upper cooking plate provided with a second electric heating element and pivotable between a first open position spaced from said lower cooking plate and a second closed position parallel to and in contact or near contact with said lower cooking plate;
   c) motor means for pivoting said upper cooking plate between said first and second positions;
   d) first switch means for activating said motor means to lower said upper cooking plate to said second position;
   e) timing means for activating said motor means to raise said upper cooking plate to said first position after a pre-determined period of time; and
   f) temperature control means for sensing the temperature of said lower cooking plate and providing electric power from a supply of electric power to said first and second heating elements when said lower cooking plate is below a predetermined temperature and ceasing to provide electric power when said lower cooking plate is above a predetermined temperature.

2. The waffle cone baking apparatus of claim 1 further comprising second switch means for selectively opening or closing a circuit for providing power to said heating elements and motor means.

3. The waffle cone baking apparatus of claim 1 further comprising third switch means for selectively activating said motor means to raise said upper cooking plate to said first position.

4. The waffle cone baking apparatus of claim 1 further comprising fourth and fifth switching means for stopping said motor means when said upper cooking plate has reached said first or second positions respectively.

5. The waffle cone baking apparatus of claim 1 further comprising alarm means for emitting a signal when said timing means activates said motor means.

6. The waffle cone baking apparatus of claim 1 wherein said motor means drives a chain connected to a tube by pulley means, and said upper cooking plate is secured to said tube.

7. An apparatus for baking waffle cones comprising two waffle cone baking units, each waffle cone baking unit comprising:
   a) a lower cooking plate provided with a first electric heating element;
   b) an upper cooking plate provided with a second electric heating element and pivotable between a first position spaced from said lower cooking plate and a second position parallel to and in contact or near contact with said lower cooking plate;
   c) motor means for pivoting said upper cooking plate between said first and second positions;
   d) first switch means for activating said motor means to lower said upper cooking plate to said second position;
   e) timing means for activating said motor means to raise said upper cooking plate to said first position after a pre-determined period of time; and
   f) temperature control means for sensing the temperature of said lower cooking plate and providing electric power from a supply of electric power to said first and second heating elements when said lower cooking plate is below a predetermined temperature and ceasing to provide electric power when said lower cooking plate is above a predetermined temperature.

8. The waffle cone baking apparatus of claim 7 further comprising a fixed axle and wherein said two upper cooking plates are pivotally mounted respectively on two linearly aligned coaxial tubes each pivotally supported on said axle.

9. The waffle cone baking apparatus of claim 8 comprising left and right housings, and wherein said axle extends between said left and right housings.

* * * * *